June 3, 1930.  C. STEDEFELD  1,762,086
METHOD OF JOINTLESSLY WELDING RAILS
Original Filed Feb. 8, 1928   2 Sheets-Sheet 1
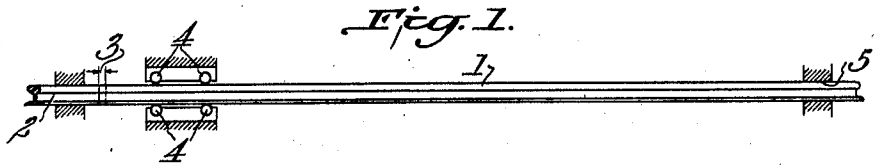
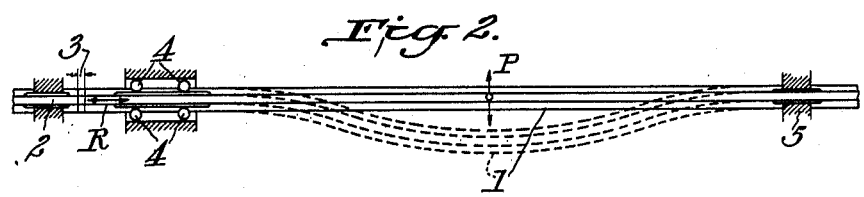
 
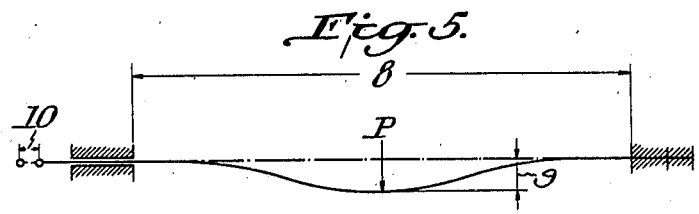
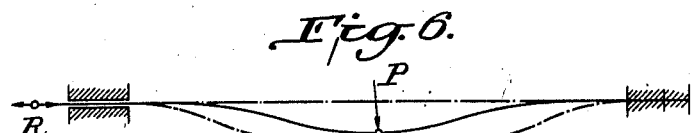

June 3, 1930.  C. STEDEFELD  1,762,086
METHOD OF JOINTLESSLY WELDING RAILS
Original Filed Feb. 8, 1928   2 Sheets-Sheet 2
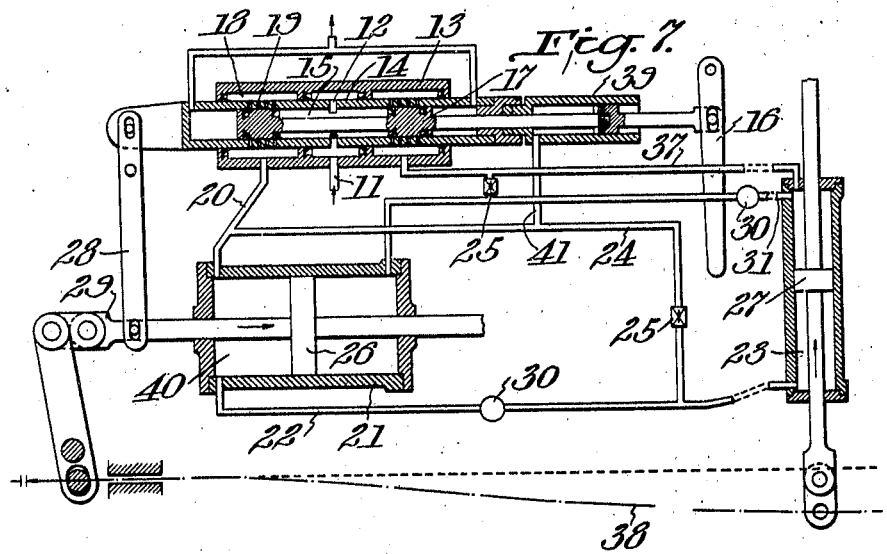
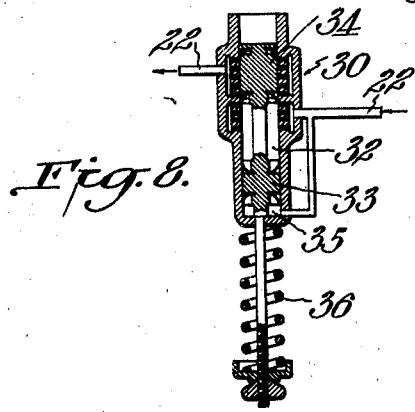
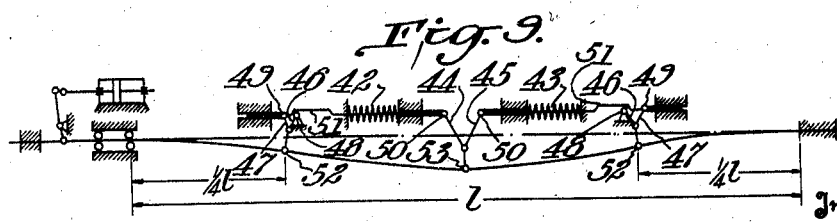

Patented June 3, 1930

1,762,086

UNITED STATES PATENT OFFICE

CURT STEDEFELD, OF HEIDELBERG, GERMANY

METHOD OF JOINTLESSLY WELDING RAILS

Original application filed February 8, 1928, Serial No. 252,932, and in Germany December 27, 1926. Divided and this application filed February 27, 1930. Serial No. 431,854.

Not only in tramway tracks in cities, but also in overland and long distance railway tracks the fish-plate joints with gaps to compensate for the expansion caused by changes in temperature between the joining ends of the rails have been recently replaced by jointless welded joints. Generally the expansion gaps are still provided at greater distances from one another, but it can be expected, considering the present state of the arc, that railway tracks having all joints welded, without any expansion gaps, may be constructed with reliability of service. In railway tracks, where expansion gaps separate greater lengths of rails from one another, these greater lengths can be welded together in the work-shops, transported to the line and there mounted. If these lengths should become very great, or if the expansion gaps shall be totally omitted, this method cannot further be employed and a great number or all of the joints must be welded out of the work-shop on the line. This involves a number of new problems, the solutions of which are given by the present invention.

As a first example the welding of the last joint between the rails of a track which has been erected from two end points will be considered, or the repairing or renewal of a defective place in a completely welded railway track.

In well suited methods of welding rail-joints, for instance in the alumino-therminal ("thermit") butt welding and the electric butt welding and particularly in the melting-off welding method the rail ends must be moved longitudinally with relation to each other. This is possible with comparatively simple apparatus when the welded rails have expansion gaps at not too great distances from one another. The problem is different when the expansion gaps lie far apart, or when no such gaps are provided. In the first case a very great length of the track must be dismounted, and furthermore it is not easy to move this length in the manner required for welding, for instance with the melting-off method. In the second case the possibility of movement disappears entirely with the omission of the expansion gaps.

Referring to the drawings:

Figs. 1 and 2 are a side elevation and a plan view, respectively, of a track structure;

Fig. 3 is a detail showing a gap between rails;

Fig. 4 is another detail showing an overlap of rails;

Figs. 5 and 6 are diagrammatic views illustrative of the invention;

Fig. 7 is a view partially in cross-section showing one form of the bending apparatus including the control means therefor;

Fig. 8 is a sectional view of one of the control valves shown in Fig. 7; and

Fig. 9 is a diagrammatic showing of a modified arrangement wherein springs are employed to effect the bending.

The fundamental idea of the method according to this invention is shown in Figs. 1 and 2. The previously described longitudinal movements are replaced by bending one rail 1 crosswise with respect to the other rail at the joint, while the end of the other rail 2 is held firmly in the clamping device. By means of computation a certain length of the rail is predetermined which is dismounted from the sleepers in one direction from the place of repairing. About the middle of the dismounted stretch a force P is provided, which is adapted to bend the rail 1 in the plane of the least moment of resistance at the right angle to its length to produce the required gap 3 at the joint to be welded. It is necessary that the end of rail 1 be moved lengthwise easily and positively without tilting, preferably by guiding it by means of the indicated rollers 4, and that the opposite end 5 of the dismounted stretch be securely held.

For the generation of the jumping pressure required in a welding connection and for the purpose of giving assistance to the force P, a force R is brought into action lengthwise of the rail at a short distance from the joint to be welded.

Another supposition for this method is, that there is no gap at the point of welding 6 in Fig. 3, but that there is a suitable overlapping 7, Fig. 4 to compensate the shortening of the rail at the welding point.

In the case that a break occurs during summer at a temperature above normal, this condition is fulfilled by the expansion caused in the rail itself. According to the temperature prevailing in winter a greater or lesser gap may arise at the point of breakage, which must be closed up, before welding can be begun. The simplest manner in which this may be done, is to warm up a stretch of the rail on one or on both sides adjacent to the part, which is to be repaired with a set of heating flames or with electricity to such an extent, that the abutting parts of the joint will overlap instead of having a gap 6 between them.

A computation shows, that the required force of movement and the stress arising when the rail is bent, are within absolutely acceptable limits, so that repair welding on the line can be done quickly and with comparatively simple means. With the rail profiles commonly used a length 8 of about 21–27 meters must be dismounted and bent out to the distance of 40–64 cms. 9 in order to obtain a burning-off and jumping length 10 of 2–4 cms., whereby the elastic limit of the rail material of about 3000 kgs./cm.$^2$ is not exceeded in bending operation. The force at the point of bending will thereby be about 500 kgs. and is therefore increased by the forces of friction easily obtainable by means of either mechanical or hydraulic devices.

The jumping pressure required, according to the method which is adopted, lies between 100 and 300 kgs. cm.$^2$ of the welding sectional area, and amounts therefore in a sectional area of 60 cm.$^2$ to the maximum of 18000 kgs.

With an hydraulic device of 50 atmospheres liquid pressure, this result can be secured with the transmission in proportion of 1:1 and a cylinder diameter of about only 210 mm.

The moving devices may be actuated mechanically, electromechanically or hydraulically. A condition for satisfactory operation is, that the movement of the end of the rail, i. e. the motive forces P and R can be controlled from a place in the immediate neighbourhood of the joint which is to be welded, so that these forces, according to the arrangement desired, will act singly or jointly and that they are timed automatically in relation to one another in such a manner, that the bending line of the dismounted part of the rail is always in all its conditions of movement a simple one without intermediate bends (Fig. 6), which would increase the strain on the rail material beyond its capacity.

When welding smaller cross sectional areas the movements may be carried out manually, preferably by providing an intermediate second transmission, so as to attain the required jumping pressure, whereas for larger sectional areas, electromechanical or hydraulic devices, because of their simple means for attaining high forces, are preferable.

The steering apparatus and the course of the liquid for this arrangement is shown diagrammatically in Fig. 7 wherein the liquid flow of both cylinders is regulated by one steering valve, which is actuated manually and arranged in such a manner, that every position of the moved rail is determined by a certain position of the hand lever. The moving operations of the first modification according to Fig. 7 are as follows: The pressure liquid coming from the conduit pipe 11 passes through the chamber 12 which is formed by the slide valve chest 13 and the steering shell 14 and from there into the chamber 15. When the hand lever 16 and therewith the steering piston 17 is moved to the left as shown in Fig. 7 the pressure liquid enters the chamber 18 through the opening 19 which has opened. From here it flows through the conduit pipe 20 to the cylinder 21 and further to the conduit pipe 22 and the cylinder 23. The conduit pipe 24 is closed in this direction by means of the check non-return valve 25. The pistons 26 and 27 now move in the directions indicated by the arrows until pivoted return lever 28, which is moved by the piston rod 29 has moved the steering shell 14 so far with respect to the steering piston 17, that the openings 19 are closed.

During movements which follow rapidly one after another the tandem arrangement of the cylinders will counteract in itself any intermediate bendings of the rail, as the crosswise cylinder will be favored with pressure liquid when the rail is bent and the lengthwise cylinder when the rail is straightened.

In order to prevent any possible intermediate bending, particularly at the start of the rail movement, throttled slide valves 30 are provided in conduits 22 and 31. One of such valves is shown in section in Fig. 8. Liquid from pipe 22 passes into cylinder 32 to thereby act upon the connected pistons 33 and 39. A pipe of smaller diameter than pipe 22 also allows the fluid under pressure to flow into cylinder 35 to thereby act upon the opposite face of piston 33. Pressure is thus gradually built up in cylinder 35 to raise pistons 33 and 34 against the tension of the adjustable spring 36, thus exposing openings in cylinder 32 whereby the liquid may pass through to the other connection of pipe 22.

To bend the rail, the hand lever 16 is moved to the right. Liquid under pressure then may pass into conduit 37, since plunger 17 exposes the proper openings in chamber 13. This liquid enters cylinder 23 above piston 27 to force the same downwardly to thus bend the rail. Liquid also passes through conduit 31 to cylinder 21 to the right of piston 26. Pressure is relieved from the opposite sides of pistons 27 and 26 by the one-way valves 25.

For clearness the rail is indicated by dotted lines 38.

By means of a cylinder 39 which is arranged, for instance around the steering slider, and which is connected with the inside 40 of the cylinder 21 by means of a pipe 41 and which therefore is held under the same pressure conditions, an effective indication of the pumping pressure is transmitted to the operator at the hand lever 16.

In the second example diagrammatically illustrated in Fig. 9 the longitudinal movement of the rail again is effected by means of a pressure liquid. Consequently the device for clamping and guiding the ends of the rails in connection with hydraulic cylinder and moving mechanism may be the same as that previously described.

The steering slider may also be the same as in Figs. 7 and 8 with the limitation of the conduit to only one double acting cylinder 21.

The bending of the rail in this example is done mechanically by spring motive power which is not immediately controlled. The arrangement provides two springs 42, 43 which act on the rail by means of the link-arms 44, 45. The system of joints is designed in such a maner, that the bending force increases steadily with the increase of the deflection. In order to avoid absolutely intermediate bendings, which for instance may arise when one spring is seized or a jamming in the guides occurs or something similar happens, the rail is moved at numerous points in such a manner, that the most favorable bending line is obtained in all positions.

In the present case, there are, besides the system of links in the middle of the dismounted rail stretch, also two more systems of links each distanced 1/41 from the place where the rail is clamped. The link arms 56 and 47 are half as long as the link arms 44 and 45. The link points 48 are firmly located whereas the link points 49 are connected with the link points 50 by means of the rods 51. Thereby it is attained, that at the points 52 the rail shows always half of its maximum bending in the middle 53 of the section, the elastic line being therefore always the most favorable with regard to the stress.

I claim:

1. The method of jointlessly welding the rails of railway tracks and repairing the same on the lines without removal thereof, which comprises detaching a long section of the rail from its supports, stretching said detached section longitudinally in the original direction of said rail into abutting engagement with the adjacent section, and welding said abutting ends.

2. The method of jointlessly welding the rails of railway tracks and repairing the same on the lines without removal thereof, which comprises detaching a long section of rail from its supports, bending said detached section out of longitudinal alignment, stretching said detached section longitudinally and into abutting engagement with an adjacent section, and welding said abutting ends.

3. The method of jointlessly welding the rails of railway tracks and repairing the same on the lines without removal thereof, which comprises detaching a long section of the rail from its supports, bending said detached portion out of longitudinal alignment to such extent that the greatest stress on the rail is below the limit of elasticity thereof to thus secure longitudinal movement of the end of said detached portion for welding purposes, and welding the end of said portion to the adjacent rail section.

4. The method of jointlessly welding the rails of railway tracks and repairing the same on the line without removal thereof, which comprises detaching a long section of the rail from its supports, heating said rail section to cause longitudinal expansion thereof such that the end will overlap the adjacent section sufficient for jumping pressure, bending the mid section of the detached portion out of longitudinal alignment, placing the end thereof in longitudinal alignment with the adjacent rail section, allowing the bent out section to straighten to thereby secure the necessary jumping pressure, and simultaneously welding the end of said detached rail section to the adjacent rail section.

5. In the method of jointlessly welding the rails of railway tracks and repairing the same on the line without removal thereof by electrical melting-off welding, the step which comprises detaching a long section of the rail from its supports, applying a stretching force to said detached section, applying a bending force to said section, automatically timing the application of said forces with respect to one another in such manner that the rail section assumes a simple bend without intermediate bends.

6. The method of jointlessly welding the rails of railway tracks without removal thereof, which comprises detaching a long section of rail from its supports, moving the end of said detached section back and forth longitudinally for electrical melting-off welding by two separately acting forces on said section, one of said forces being applied longitudinally of the detached section adjacent the end thereof, and the other of said forces being applied cross-wise of said section to bend the same.

CURT STEDEFELD.